UNITED STATES PATENT OFFICE.

ORAZIO LUGO, OF NEW YORK, N. Y., ASSIGNOR, BY MESNE ASSIGNMENTS, TO THE MANUFACTURED RUBBER COMPANY, OF CAMDEN, NEW JERSEY.

RUBBER SUBSTITUTE OR ARTIFICIAL RUBBER.

SPECIFICATION forming part of Letters Patent No. 639,926, dated December 26, 1899.

Application filed March 6, 1899. Serial No. 708,014. (No specimens.)

*To all whom it may concern:*

Be it known that I, ORAZIO LUGO, a citizen of the United States, residing at New York, in the county of New York and State of New York, have invented certain new and useful Improvements in Rubber Substitutes or Artificial Rubber; and I do declare the following to be a full, clear, and exact description of the invention, such as will enable others skilled in the art to which it appertains to make and use the same.

This invention relates to artificial rubber or rubber substitutes.

The object of the invention is to provide an article of manufacture from cheap and easily-obtainable substances which will be capable of the uses of india-rubber and which will also be capable of being combined with india-rubber of any grade or quality.

With this object in view the invention consists of a rubber substitute or artificial rubber consisting of sulfurized oil practically free from glycerin compounds.

Further, the invention consists of a compound consisting of a rubber substitute or artificial rubber composed of sulfurized oil practically free from glycerin compounds and india-rubber.

Rubber substitutes as heretofore produced from sulfurized oleaginous substances or oils are incapable of forming a satisfactory combination with natural rubber principally for the reason that they contain glycerin or glycerin compounds. The article which forms the subject-matter of this invention is practically free from these substances and will combine with rubber.

In producing my rubber substitute by one method, which I believe to be the best, I mix with oil—such, for instance, as linseed-oil or with a mixture of oils—a quantity of sulfur, which is about ten per cent. of the oil treated, and then heat the mixture, at the same time agitating it until a solid mass is produced. By increasing the proportion of sulfur used the time required is lessened. The degree of heat to which the mixture is subjected is approximately 320° Fahrenheit. This is one way of producing sulfurized oil.

In order to render the solid mass produced as above useful as a rubber substitute, I add to it a quantity of water and then heat the mixture in a closed vessel to about 320° Fahrenheit for a time sufficient to allow the mixture to become liquid. Under this treatment the glycerin in the mixture (sulfurized oil) becomes decomposed and the sulfur enters into combination or admixture with the radical of the oil, producing a compound. The glycerin enters into solution in the water. The liquid thus produced is freed from water and glycerin and a product capable of use as a coating for metal for preventing oxidation and for other uses is obtained.

To convert the liquid product into a substance corresponding in texture and other qualities to those of rubber, I add to it a quantity of sulfur corresponding to ten per cent. (more or less) of the compound and heat the mixture to about 320° Fahrenheit and at the same time agitate it until a homogeneous plastic mass is produced. The product thus produced has all the desirable qualities of virgin india-rubber.

If a harder substance than that obtained as above is desired, the steps of hydrosaponification, freeing from water, addition of sulfur, and heating and agitation, to which the sulfurized oil is subjected, as above set forth, may be repeated. The article produced as described may be masticated with the addition of any desired form of rubber—such, for instance, as what is known in trade as "rubber shoddy"—and thus a cheap and useful rubber substitute is produced.

From ten to seventy-five per cent., by weight, of the substitute may be employed along with rubber, according to the characteristics required in the finished product.

Having thus described my invention, what I claim as new, and desire to secure by Letters Patent, is—

1. A rubber substitute or artificial rubber consisting of sulfurized oil practically free from glycerin compounds, substantially as described.

2. A rubber substitute or artificial rubber consisting of sulfurized oil practically free from glycerin compounds, and india-rubber, substantially as described.

In testimony whereof I affix my signature in presence of two witnesses.

ORAZIO LUGO.

Witnesses:
D. R. PATTERSON,
CHAS. V. SOMMER.